(12) United States Patent
Rock

(10) Patent No.: US 9,537,161 B2
(45) Date of Patent: Jan. 3, 2017

(54) FREEZE-TOLERANT VALVE

(71) Applicant: GM Global Technology Operations LLC, Detroit, MI (US)

(72) Inventor: Jeffrey A. Rock, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 216 days.

(21) Appl. No.: 14/051,827

(22) Filed: Oct. 11, 2013

(65) Prior Publication Data

US 2015/0104722 A1   Apr. 16, 2015

(51) Int. Cl.

| | |
|---|---|
| F16K 25/00 | (2006.01) |
| H01M 8/04 | (2016.01) |
| F16K 15/14 | (2006.01) |
| F16K 15/18 | (2006.01) |
| F16K 31/126 | (2006.01) |
| F16K 17/04 | (2006.01) |
| F16K 29/00 | (2006.01) |
| F16K 31/04 | (2006.01) |

(52) U.S. Cl.
CPC ........ *H01M 8/04253* (2013.01); *F16K 15/144* (2013.01); *F16K 15/145* (2013.01); *F16K 15/186* (2013.01); *F16K 17/0426* (2013.01); *F16K 29/00* (2013.01); *F16K 31/04* (2013.01); *F16K 31/1266* (2013.01); *H01M 8/04089* (2013.01); *H01M 8/04126* (2013.01); *H01M 8/04201* (2013.01); *Y10T 137/7761* (2015.04); *Y10T 137/7895* (2015.04)

(58) Field of Classification Search
None
See application file for complete search history.

(56) References Cited

U.S. PATENT DOCUMENTS

| | | | | |
|---|---|---|---|---|
| 1,667,143 | A | * | 4/1928 | De Luiz .................. F16K 15/16 |
| | | | | 137/515.7 |
| 4,181,151 | A | * | 1/1980 | Ensign ..................... 137/625.28 |
| 4,360,482 | A | * | 11/1982 | Asai ............................. 261/44.4 |
| 4,659,062 | A | * | 4/1987 | Mooney ....................... 251/61.1 |
| 5,364,066 | A | * | 11/1994 | Dorste et al. ................. 251/122 |
| 5,491,976 | A | | 2/1996 | Rock et al. |
| 2006/0088745 | A1 | * | 4/2006 | Kanno ............................ 429/24 |
| 2007/0141418 | A1 | * | 6/2007 | Ota et al. ........................ 429/24 |

* cited by examiner

*Primary Examiner* — Miriam Stagg
*Assistant Examiner* — Haroon S Sheikh
(74) *Attorney, Agent, or Firm* — Quinn Law Group

(57) ABSTRACT

A valve for reducing the likelihood of ice-related blockage in a fuel cell and methods for starting a fuel cell system. The valve includes a valve plate and coupling plate that are cooperative with one another within a valve body such that flexural forces imparted to the valve plate from a pressurized fluid are transferred to localized contact surfaces between the valve plate and coupling plate. By concentrating these forces to such a localized area, improvements in the ability of the fluid to initiate and propagate a crack in built-up ice around the valve's seating region is improved. In this way, fuel cell starting in cold conditions—such as those associated with temperatures at or below the freezing point of water—is also improved.

22 Claims, 6 Drawing Sheets

FREEZE-TOLERANT VALVE

BACKGROUND OF THE INVENTION

This invention relates generally to valves used in fuel cell systems, and more particularly to valves used in moisture-prone environments in such fuel cell systems such that the valves do not become blocked due to ice buildup under freezing conditions, as well as methods of fuel cell system start-up under frozen conditions such that blockage due to ice formation is inhibited.

A significant benefit to fuel cells as an energy-producing means is that it is achieved without reliance upon combustion as an intermediate step. As such, they have several environmental advantages over internal combustion engines (ICEs) and related power-generating sources. In a typical fuel cell—such as a proton exchange membrane or polymer electrolyte membrane (in either event, PEM) fuel cell—a pair of catalyzed electrodes are separated by an ion-transmissive medium (such as Nafion™). An electrochemical reaction occurs when a gaseous reducing agent (such as hydrogen, $H_2$) is introduced to and ionized at the anode and then made to pass through the ion-transmissive medium such that it combines with a gaseous oxidizing agent (such as oxygen, $O_2$) that has been introduced through the other electrode (the cathode); this combination of reactants form water as a benign byproduct. The electrons that were liberated in the ionization of the hydrogen proceed in the form of direct current (DC) electricity to the cathode via external circuit that typically includes a motor or related load where useful work may be performed. The power generation produced by this flow of DC electricity can be increased by combining numerous such cells to form a fuel cell stack or related assembly that makes up a fuel cell system.

Various fuel cell system operating conditions can lead to high water content in one or both of the reactant streams. In one form, such conditions may arise out of the use of devices such as a water vapor transfer (WVT) unit that helps ensure adequate humidity levels within various parts of the fuel cell stack. In certain operating conditions (including those associated with WVT usage), it is desirable to remove excess moisture to ensure that ice blockage of key flowpaths is avoided in conditions where such moisture may be exposed to freezing temperatures. Avoiding ice blockage is especially important during vehicle starting, where access to electricity for use in ancillary vehicular systems (such as heating, cooling, lighting and other systems) is generally not available until the fuel cell stack is operational.

Valves—with their relative movement between adjacent surfaces as a way to provide selective flow—are particularly susceptible to ice blockage, especially between such surfaces that come into intermittent contact with one another during valve opening and closing. One example are check valves, which are frequently used in fuel cell systems to limit reactant backflow into the stack during periods of non-operation of the stack in order to minimize undesirable reactions between catalytic substrates within the stack and an oxygen-bearing or hydrogen-bearing fluid. The type of complete valve closure that is needed to avoid the aforementioned reactions is often difficult to achieve, especially in situations where ice bonds are formed on valve sealing interfaces after a cold soak in a humid environment. Conventional valves (which in one form may be formed as a diaphragm that is responsive to a pressurized reactant bearing against it) exist in a deformed state at temperature for the duration of stack operation; this in turn can lead to warpage or related sustained permanent deformation that exacerbates the sealing or leakage problems. Moreover, stresses imparted to the diaphragm from the reactant is nearly uniform around the diaphragm perimeter; such relatively larger surface contact requires a significantly high reactant force, which in turn delays the onset of ice breakup and the subsequent opening of the valve. In some circumstance, this force may not be sufficient to overcome the built-up ice, leading to the aforementioned failed start.

SUMMARY OF THE INVENTION

The present invention includes a passive valve design that retains its ability to open and close, even under freeze-inducing ambient temperatures where an ice bond may form. Such a valve may be placed in either or both of the cathode reactant flowpath or the anode reactant flowpath. In fuel cell system configurations where a WVT is employed, such valve (or valves) may be fluidly placed between the WVT and a fuel cell stack to provide the necessary isolation of the stack to help protect the cathode side of the stack from air intrusion during stack off time. Alternatively, an inlet form of the valve may be placed upstream of the dry side of the WVT with an outlet form of the valve downstream of the wet side of the WVT. Because the WVT is capable of producing significant levels of moisture or related humidity within the cathode flowpath, such a valve is especially useful. Likewise, such valves may be used with systems that have no back pressure valve, as well as system where such a back-pressure valve is prone to sealing inadequacies.

According to a first aspect of the invention, an ice-resistant valve for use in a fuel cell system is disclosed. The valve includes a fluid inlet, a fluid outlet, a body defining a fluid reactant passageway through it that is cooperative with the fluid inlet and the fluid outlet, and an actuation member disposed within the body. The actuation member includes a flexible diaphragm, a coupling plate and a valve plate, where the valve plate defines a seating region cooperative with the body such that during a closed state of the valve, the valve plate substantially prevents the fuel cell reactant from flowing between the fluid inlet and the fluid outlet through the fluid reactant passageway. Likewise, the diaphragm operates such that during an open state of the valve, the valve plate becomes unseated to permit the fuel cell reactant to flow. The valve plate is situated adjacent the coupling plate, and includes one or more tab regions defining a localized connection surface that is smaller than a surface defined by the seating region. In this way, the smaller contact surface means that the initiation of an ice-breaking movement of the valve plate will be easier to effect than under traditionally-seated valves where a substantial entirety of the connecting adjacent surfaces may have ice formed on them. Specifically, the same amount of movement force imparted from the reactant fluid to the valve plate is concentrated in a much smaller interface region under the present invention than it is with a traditionally-seated valve. More particularly, the increased notch sensitivity of the present invention is such that flexural forces induced in the valve plate in response to movement that are in turn in response to the fluid force can be more efficiently used at the localized connection surface of the present invention as a way to initiate a breakup of any ice formed in the seating region.

According to another aspect of the invention, a fuel cell system includes one or more fuel cells each of which includes an anode to accept a hydrogen-bearing reactant, a cathode to accept an oxygen-bearing reactant and a medium cooperative with the anode and the cathode such that upon catalytic transformation of at least one of the reactants, the catalytically-transformed reactant travels from one of the anode and the cathode to another of the cathode and the anode through the medium. The system also includes an anode flowpath in fluid communication with the anode and a cathode flowpath in fluid communication with the cathode, each of the anode flowpath and the cathode flowpath cooperative with a fluid inlet configured to receive a fuel cell reactant and a fluid outlet disposed fluidly downstream of the fluid inlet; and at least one valve disposed in at least one of the anode flowpath and the cathode flowpath and defining a fluid reactant passageway therethrough, the at least one valve comprising a fluid inlet, a fluid outlet, a body defining a fluid reactant passageway therethrough that is cooperative with the fluid inlet and the fluid outlet, and an actuation member comprising: a flexible diaphragm selectively cooperative with the body and defining a seating region therebetween; and a valve plate situated adjacent the coupling plate and defining at least one tab region that defines a localized connection surface between the valve plate and at least one of the body and the diaphragm that is smaller than a surface defined by the seating region such that commensurate with or prior to movement of the diaphragm between a closed valve state and an open valve state in response to a load imparted by the fuel cell reactant, a flexural force induced in the valve plate by the load initiates a breakup of any ice formed in the seating region at the localized connection surface.

According to another aspect of the invention, a method of inhibiting freeze-related blockage of a reactant flowpath in an automotive fuel cell system, the method comprising: configuring a valve to be fluidly cooperative with the reactant flowpath, the valve defining a body with an actuation member disposed therein, the actuation member comprising: a flexible diaphragm selectively cooperative with the body; and a valve plate situated adjacent the coupling plate and defining at least one tab region that defines a localized connection surface between the valve plate and the coupling plate that is smaller than a surface defined by the seating region; and introducing at least one of a hydrogen-bearing reactant and an oxygen-bearing reactant to the valve plate such that a flexural force induced in the valve plate preferentially initiates a breakup of any ice formed in the seating region at the localized connection surface. In one particular form, the method is for starting the fuel cell system in temperatures where residual water present in the system may be prone to freezing, especially at movement-critical components such as a check valve. By providing a clear path in the check valve, humid gas under freezing conditions may be delivered without the need for supplemental devices (such as a backpressure valve).

BRIEF DESCRIPTION OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
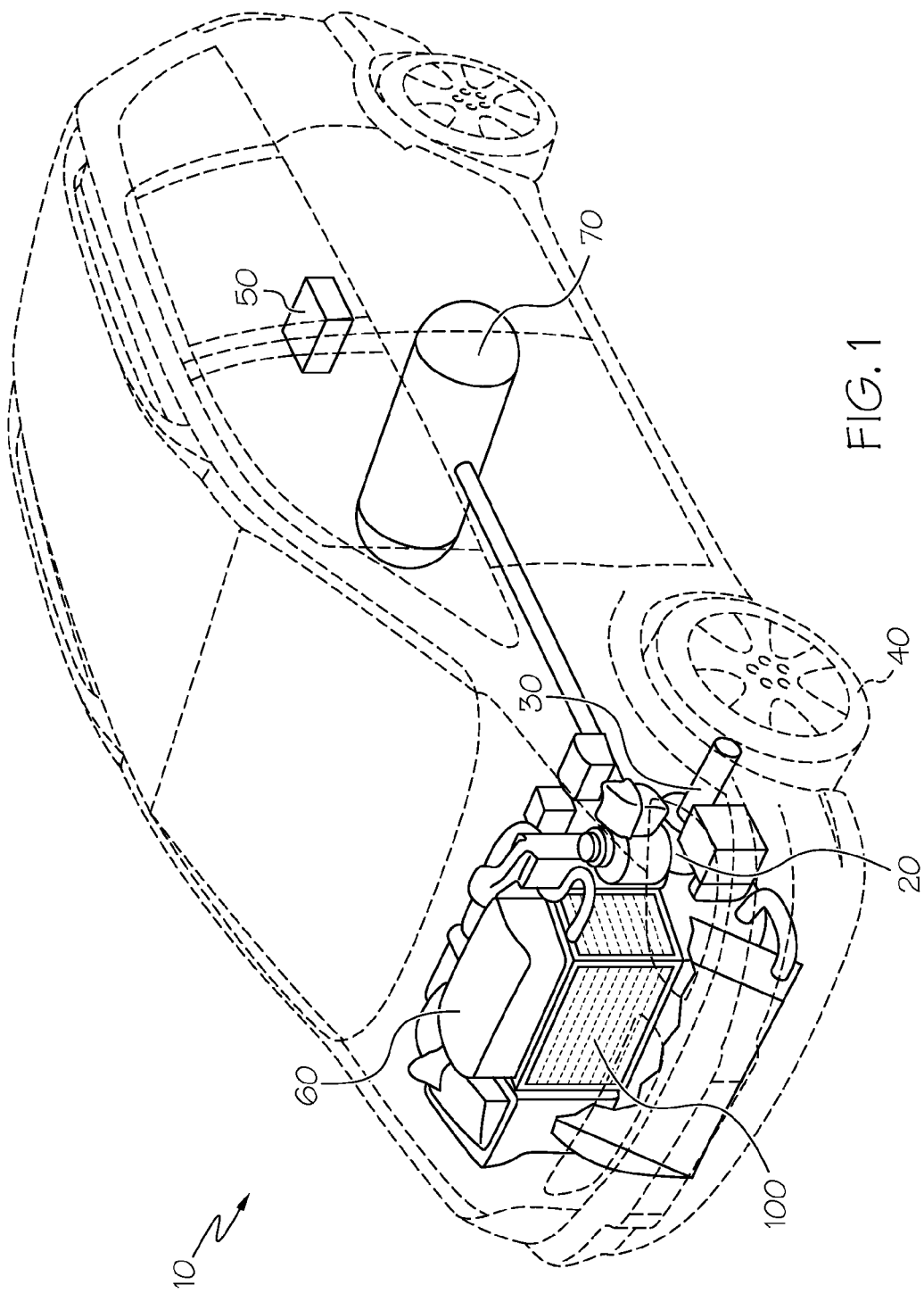
FIG. 1 is a cutaway view of an automobile employing a fuel cell system with the ice blockage-prevention features according to an aspect of the present invention.

Referring first to FIG. 1, the major components of a vehicle 10 and a fuel cell system 100 are shown. Other features of vehicle 10 may include an energy conversion device 20 (for example, in the form of an electric motor that acts as a load for the current being generated by fuel cell system 100) coupled to a drivetrain 30 (such as a driveshaft or the like) and one or more motive devices 40, shown notionally as a wheel. Other ancillary equipment may include one or more batteries 50, as well as electronics 60 in the form of controllers or related system management hardware, software or combinations thereof. While the present system 100 is shown for mobile (such as vehicular) applications, it will be appreciated by those skilled in the art that it is equally applicable to stationary applications, such as stand-alone power generation equipment or the like.

The system 100 is coupled to a fuel storage system 70 (made up of one or more fuel tanks) that are configured to contain a hydrogen-bearing reactant. Although not shown, an optional fuel processing system may also be used; such a system may include a conversion system (such as a methanation reactor or other such equipment known to those skilled in the art) to change a hydrogen-bearing precursor into a form suitable for catalytic reaction in the fuel cell stacks discussed below. It will also be appreciated by those skilled in the art that other fuel delivery and fuel processing systems are available. Likewise, the features of an air delivery system for the oxygen-bearing reactant may be disposed between an oxygen source (such as the ambient atmosphere) and the fuel cell stack. Such a system may include fluid delivery equipment in the form of conduit, valves, compressors, controllers or the like (none of which are shown). As will be appreciated by those skilled in the art, the stack is a repeating arrangement of numerous individual fuel cells such that the power output is sufficient to operate the drivetrain 30 through the energy conversion device 20 or other load.

Figure 2:
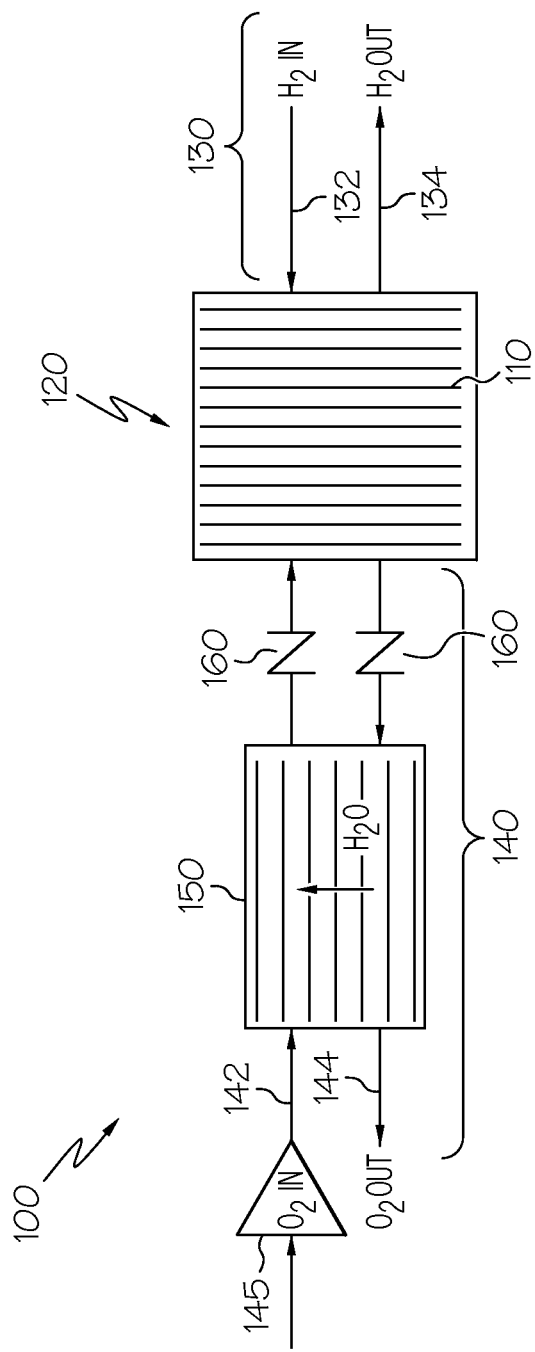
FIG. 2 shows a simplified schematic view of the fuel cell system useable in the automobile of FIG. 1, including placement of a check valve in accordance with one embodiment of the present invention.

Referring next to FIG. 2, a schematic shows that the fuel cell system 100 is made up of—in addition to the aforementioned ice-resistant valve 160—one or more fuel cells 110 that collectively form a stack 120. Each cell 110 is made up of an anode to accept a hydrogen-bearing reactant, a cathode to accept an oxygen-bearing reactant and a medium (such as the aforementioned Nafion™ (or the like) to form a PEM. Such a configuration promotes the delivery of at least a catalytically-ionized portion of the hydrogen-bearing reactant from the anode to the cathode. Additional components, such as an anode flowpath 130 and a cathode flowpath 140—each with respective inlets 132, 142 and outlets 134, 144—help to deliver the reactants to the respective sides of the PEM, while a WVT 150 may be used to provide humidity control within stack 120. One or more pumps or related pressure-increasing devices 145 may be used to facilitate delivery of the reactant-bearing fluids to the respective anode and cathode flowpaths 130, 140. It should be noted that fuel cell system 100 may either be configured (a) with an expander, in which case no backpressure valve is required, or (b) without an expander. In either case, such a backpressure valve (not shown) may be used to modulate the pressure within the stack. Elevating the cathode pressure increases stack 120 power but consumes electrical power to drive a pump 145 harder. Depending on device efficiencies, operating temperatures and humidification requirements, optimum pressure may be high enough that the energy dissipated in a backpressure valve (which functions in a manner similar to a throttle) could justify the expense of replacing the valve with a more expensive expander (which functions in a manner similar to the exhaust side of a turbocharger) to recover the energy. In some cases both may be needed for proper control. If range and efficiency are most important, high pressure systems with expanders are generally preferred. On the other hand, if cost is paramount, lower pressure systems with backpressure valves are preferred. In extreme cases (i.e., very inexpensive systems with little or no concern for efficiency of operation), neither will be used such that the system will just run at ambient pressure.

High operating temperatures require higher pressure to keep the water vapor in the reactants from becoming a significant diluent. Increasing pressure for a given temperature reduces the amount of water required for humidification, thereby reducing the size and cost of the WVT 150. In one form, the expander may be placed downstream of the WVT 150 and an isolation valve. In such case, the backpressure valve (not shown) could go immediately before or after the expander. Backpressure control can also be accomplished within the expander using a variable nozzle turbine (VNT) expander (not shown). While such a configuration may employ either a common shaft connection between the compressor and turbine, a separate shaft configuration can also be used, depending on cost, complexity and efficiency concerns, where compressor and generator controls on the expander may exacerbate these concerns, making such control prohibitive.

Figure 4:
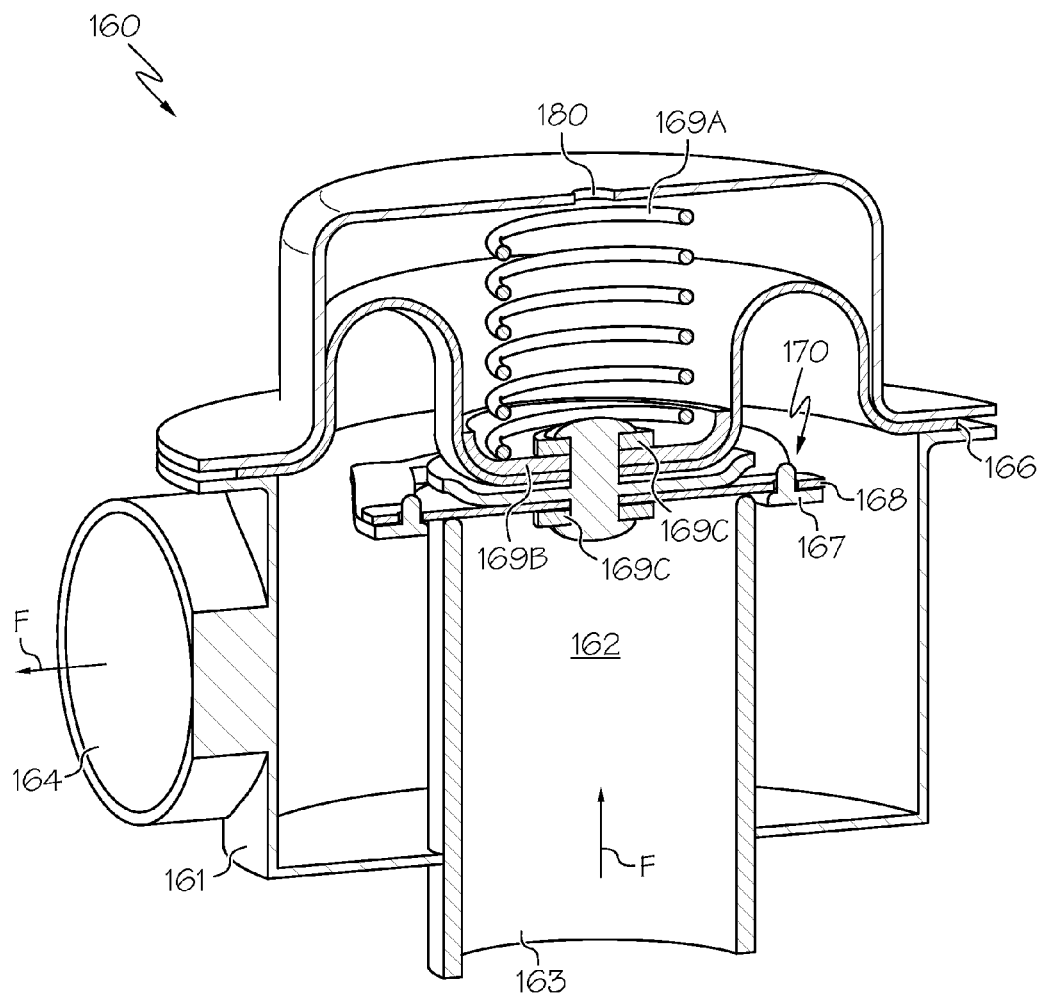
FIG. 4 is a cutaway view of the placement of the valve of FIGS. 3A through 3D into a housing that is in turn placed in a reactant flowpath.
Figure 5:
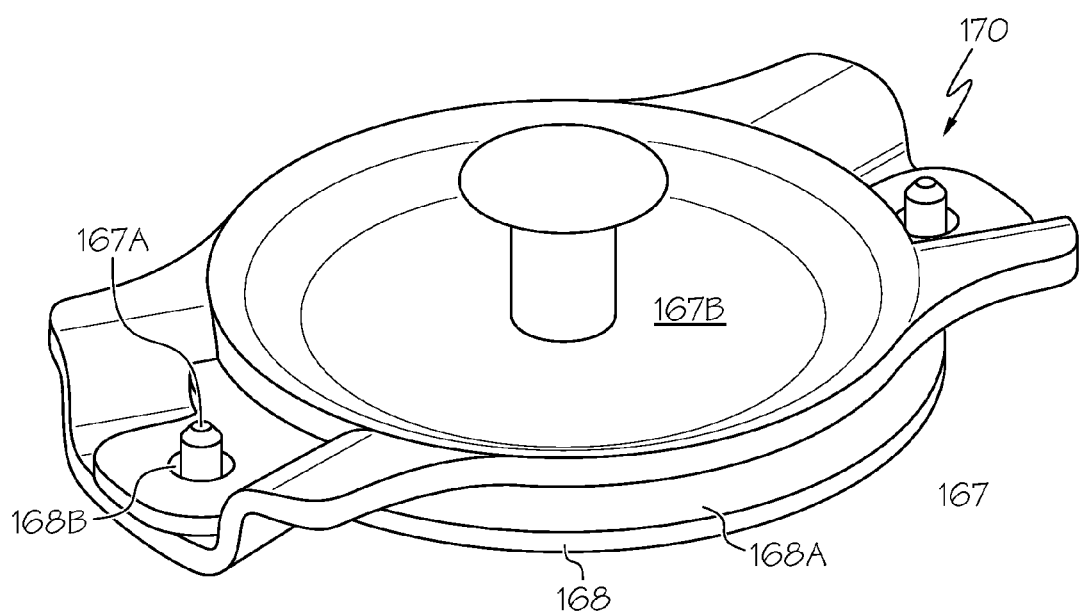
FIG. 5 is a view of the check valve with tab connectors in accordance with one embodiment of the present invention.

Referring next to FIGS. 4 and 5 in conjunction with FIG. 2, the valve 160 may be placed in either or both of the anode flowpath 130 and a cathode flowpath 140 to be fluidly cooperative with one or both. When configured as an outlet valve in general and a cathode stack outlet valve in particular, valve 160 defines a body 161 with a fluid reactant passageway 162 made up of an inlet 163 and an outlet 164. An actuation member (shown presently in the form of a diaphragm 166) is used to permit selective introduction and removal of a reactant-bearing fluid to and from stack 120. In the present context, fluid-based passageways, streams, channels, conduit, loops, flowpaths and related terms may be used interchangeably to describe the conveyance of the reactant-bearing fluid from one location to another; their meaning should be apparent from the context. In one form, a dimension of the valve 160 could be 50 mm by 36 mm with a 30 mm ID across the inlet 163.

In one form when used in conjunction with a cathode stack outlet, valve 160 may be configured as a diaphragm-actuated stack isolation valve, where the top cavity 180 is vented to the atmosphere, and where the valve 160 opens as the reactant-bearing fluid supply pressure increases through inlet 163. Because valve 160 is preferably upstream of an expander in system 100, the pressure drop is only due to turns defined by a reactant passageway (discussed in more detail below); this in turn ensures that the stack vacuum works to close the valve 160. The stack outlet configuration shown is able to avoid diaphragm inversion, which is the flipping of the diaphragm through the center position. By setting the flow direction F so the vacuum will not act on the rolling part of the diaphragm 166, such a condition may be avoided. As mentioned above, the valve 160 shown in FIG. 4 can also be used as an inlet isolation valve, where the flow directions are merely reversed from the ones depicted in the figure. In another embodiment (not shown), the valve 160 could be used as a diaphragm actuated stack isolation valve with a back pressure control function. In this case, the top cavity 180 is either vented to the atmosphere or connected to a WVT supply pressure with a solenoid (such as a 3 port pulse width modulation (PWM) electric solenoid where the various ports include one connected to the chamber, one to vent and one to the WVT supply pressure). Such a solenoid would apply variable amounts of pressure by alternately pressurizing and venting the chamber fast enough to produce an average pressure. Increasing the fraction of the time (duty cycle) of the pressurized portion of the cycle increases the average result. An orifice such as top cavity 180 would assure that total flow loss is not excessive. Both the minimum pressure drop and failure mode pressure are set by spring force, whereas the stack vacuum works to close the valve 160. The diaphragm 166 (discussed in more detail below) would stay inverted from the shape shown.

In one preferred (although not necessary) embodiment, valve 160 is configured as a check valve to isolate the stack 120 from reactant intrusion during times when the stack 120 is not operational. As mentioned above, flexible diaphragm 166 is selectively cooperative with the body 161 to act as an actuation member. Valve 160 further includes a coupling plate 167 and a valve plate 168; between them, they cooperate with the body 161 and diaphragm 166 (or other actuation mechanism) to permit the selective breakup of built-up ice at discrete locations on the surface of the a coupling plate 167 and a valve plate 168. Such an approach—which facilitates a more localized initiation of a crack or related fissure in the built-up ice—will allow a smaller, more simplistic construction of valve 160.

Valve plate 168 defines a seating region 168A that is adjacently-placed relative to the relatively rigid coupling plate 167 such that during a closed state of valve 160, the valve plate 168 substantially prevents the reactant-bearing fluid from flowing along flow direction F between the inlet 163 and the outlet 164 through the reactant passageway 162. In a preferred embodiment, diaphragm 166 is made from a rubber that can flex in response to pressure differentials across its inlet 163 and outlet 164, while valve plate 168 is also deformable and preferably made from a sheet of plastic material. Likewise, the diaphragm 166 is such that during an open state of valve 160, the valve plate 168 becomes unseated to permit the reactant to flow. Coupling plate 167 is situated adjacent the diaphragm 166 and includes one or more tab regions 167A that defines a localized connection surface 170 between it and apertures 168B formed in a portion of the valve plate 168. Coupling plate 167 further defines a seating region 167B that is conformally shaped to accept a complementary lower surface of diaphragm 166. Significantly, the size of the contact of the localized connection surface 170 is much smaller than a surface defined by the seating region 168A. In this way, a load L imparted by the introduction of reactant is such that either prior to or commensurate with movement of the diaphragm 166 between the closed and open states, a flexural force (indicated my moment M, see FIG. 3C in particular) induced in the valve plate 168 by the load L initiates a breakup of any ice formed in the seating region at the localized connection surface 170 rather than having to break it up along a substantial entirety of the seating region 168A (which is shown presently as a peripheral surface of valve plate 168).

Because ice is notch-sensitive, a greater percentage of load L (as well as the concomitant moment M) can be focused on a smaller location (specifically, the localized connection surface 170 that is formed adjacent the tab regions 167A and apertures 168B) to promote greater ease in breaking up any ice formation. The present design addresses significant failure mode requirements of system 100, including a "fail fully or partially closed" situation for a backpressure valve. A bias mechanism 169 that includes a spring 169A, spring seat 169B and retainer 169C may be used to keep valve 160 in a predetermined state in the absence of load L imparted by fluid flow F.

In an ideal operation, the system would seal when the valve plate 168 touches the body 161, but in reality, extra force is needed to deform the surfaces to close gaps due to surface finish or geometry irregularities. The spring 169 provides this extra force and introduces a bias in the sense that some pressure is required to open it. That pressure limits the range of regulation when used for backpressure control.

Figure 3A:
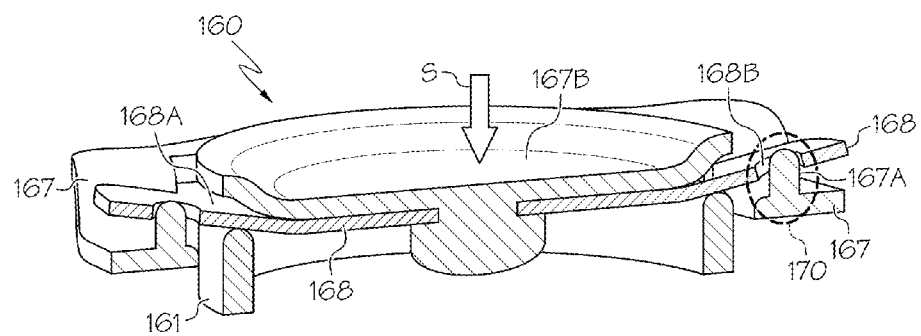
FIGS. 3A through 3C show a cutaway view of the check valve of FIG. 2 during various stages of valve operation.
Figure 3B:
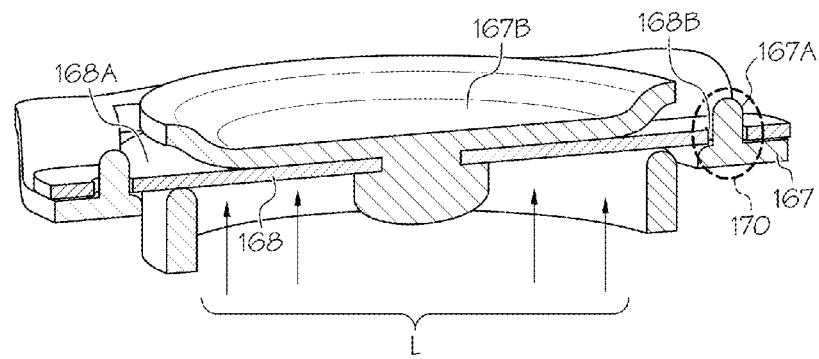
Figure 3C:
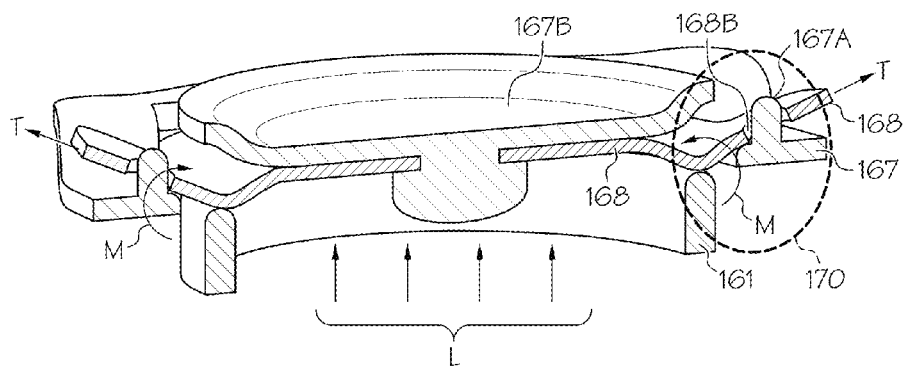

Referring next to FIGS. 3A through 3C, valve 160 will be particularly discussed in conjunction with its placement in the cathode flowpath 140 of the system 100 of FIG. 2 (although it will be appreciated that the same applies mutatis mutandis to the anode flowpath 130 as well). Valve 160 protects the cathode-side of the stack 120 from air intrusion during times when stack 120 is not operational. Correct operation of the valve 160 is especially important in situations where there is either no backpressure valve or one that does not seal well. Thus, for example, in situations where either a backpressure valve was designed with clearance which allows oxygen to diffuse into the stack 120 or those using an expander system, both tend to permit a significant amount of diffusion, so it is up to the isolation valve to be the diffusion barrier. Significantly, the localized connection surface 170 made up of the tab regions 167A of valve plate 168 can be—upon application of load L—flexed against a rigid member that is part of the body 161 placed behind the flexing valve plate 168 such that a moment M is induced in the tab regions 167A. This has the effect of focusing the pneumatic force generated by the opening pressure of the reactant-bearing fluid that flows along flow direction F on the tab regions 167A and apertures 168B rather than around the larger peripheral dimensions of the seating region 168A as a whole. In one form, a four-fold increase in the maximum stress can be applied to an ice bond over that of a conventional seating arrangement. As mentioned above, once a crack is formed locally at the tab region 167A, the notch sensitivity and brittle behavior of the ice should cause the balance of the bond along seating region 168A to fail and allow the valve 160 to open as desired.

Referring first to FIG. 3A, when the valve 160 is in its closed (dormant) state (i.e., prior to the application of a force distributed against its lower surface), valve plate 168 is in an as-formed deflected state. Creep deformation is not a concern as this deflection is not present during operation at creep-inducing temperatures. Radial symmetry is chosen to assure deflection does not produce gaps; as such, in one preferred form, at least the valve plate 168 is of a generally cylindrical shape for the portion that engages with body 161 along the seating region 168A. As stated above, in one preferred form, valve plate 168 is made from a plastic-based material, including PTFE (Teflon), PEI (Ultem), PTFE coated PEI, or polypropylene. A rubber version may also be used, subject to modifications in the design, such as employing a wider retainer 169C (especially in its lower engaging portion) around the stem of the diaphragm 166 that is used to engage spring 169A. In the event a rubber version were used, it would employ material properties to manage the desired tensile strain in a majority of the perimeter with desired tensile stiffness in the tab regions 167A. In yet another version, a composite-based fabric-reinforced rubber sheet with fibers oriented along the tab regions 167A could also be used. The slight deformation shown in FIG. 3A to the valve plate 168 is used to address height tolerances between the apertures 168B and the tab regions 167A of the coupling plate 167, as well as flatness tolerances between them. Referring next to FIG. 3B, when the valve 160 starts to open to an active state in response to a rising pressure differential imparted by load L across the diaphragm 166 and valve plate 168, at least the valve plate 168 deflects beyond neutral to a relatively planar (i.e., flat) shape. Referring next to FIG. 3C, as the valve plate 168 continues to deflect upward, additional pneumatic forces start to appear at the tab regions 167A due to bending stiffness and tensile stiffness of the valve plate 168 in order to produce moment M. In one form, a 100 kPa fluid pressure differential over a 30 mm diameter valve plate 168 generates 16 lbs of total force. The deflection of the valve plate 168 closes any and begins to apply a peel force at both tab regions 167A. One form of such peel forces is in the form of tensile force T that extends along the outward edges of tab regions 167A and the corresponding localized connection surface 170 that is formed around these regions and the apertures 168B.

In another version (not shown) a double-diaphragm valve configuration may be used. Adding another atmosphere referenced diaphragm to the valve would make it easier to open when there is a vacuum inside the stack 120. Such a configuration would be especially beneficial to the inlet side of the stack 120, where the necessity of such inclusion depends on the dead head pressure capability of the compressor 145 or the presence of a compressor recirculation valve or stack bypass valve (neither of which are shown) to allow the compressor 145 to avoid being dead-headed when the valve is closed. Thus, the double diaphragm valve would be used if the dead-headed supply pressure was not adequate to open the single diaphragm version discussed above while at a partial vacuum. Such could also be used on the anode side of stack 120, especially for breaking ice formed on an anode drain/purge valve.

Figure 6:
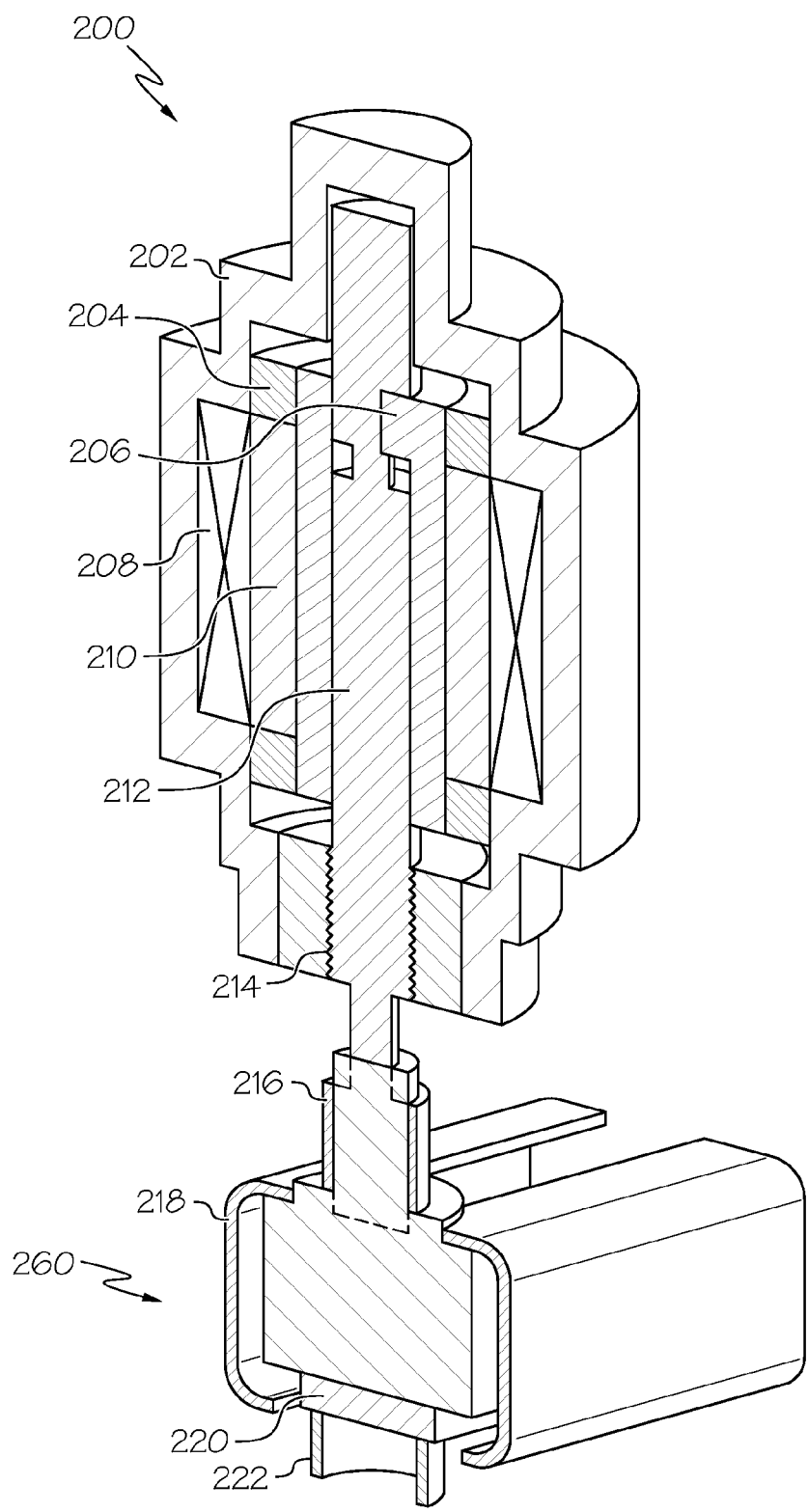
FIG. 6 shows an alternate embodiment of a valve with a stepper motor actuation.

Referring next to FIG. 6, a variation on a valve 260 that is actuated by a stepper motor 200 is disclosed. Motor 200 includes a housing 202, bearing 204, drive key 206, coils 208, rotor 210, shaft 212 and threads 214. A connector 216 secures the rotatable shaft 212 to the coupling bar 218 and valve plate 220. In the present figure, valve plate 220 corresponds generally to valve plate 168, while valve seat 222 corresponds to the seal area of body 161 of FIGS. 3A though 3C, 4 and 5. Unlike valve 160 discussed above, the simplified valve 260 does not require the pressure balancing diaphragm 166 of FIG. 4 to act as an actuating member; instead, the motor 200 can act as the actuating member. Such a configuration may be particularly useful in situations where stack cooling may produce significant vacuum levels (for example, up to about 40 kPa) inside the stack 120. While such levels may not inhibit a traditional outlet check valve 260 operation (as it would be self energizing in that direction), a traditional check valve 260 disposed on the inlet side would require a 40 kPa spring to keep it from being pulled open; such a spring would then introduce 40 kPa pressure drop during stack operation. The valve 260 could take advantage of an atmosphere referenced diaphragm assist as a way to meliorate this potential problem.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component. Likewise, it is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A flow-control valve for a fuel cell system, said valve comprising:
   a fluid inlet configured to receive a fuel cell reactant;
   a fluid outlet disposed fluidly downstream of said fluid inlet;
   a body defining a fluid reactant passageway therethrough that is cooperative with said fluid inlet and said fluid outlet, said body having a valve seat within said fluid reactant passageway between said fluid inlet and fluid outlet;
   a generally rigid coupling plate adjacent said valve seat, said coupling plate including one or more protruding tabs;
   a biasing member biasing said coupling plate towards said valve seat and
   a valve plate seated on said valve seat interposed between said coupling plate and said body, said valve plate defining a seating region adjacent said coupling plate and having a localized connection surface with one or more apertures receiving therein the one or more tabs of said coupling plate, the localized connection surface pressing against said body and said coupling plate to define a point of inflection within said valve plate such that a flexural force induced in said valve plate by a load imparted thereto causes a moment to form at said localized connection surface to thereby initiate a breakup of ice formed at said localized connection surface.

2. The valve of claim 1, further comprising an actuating diaphragm cooperative with said valve plate to provide selective actuation thereto.

3. The valve of claim 2, wherein said seating region defines a substantially curvilinear shape about its periphery.

4. The valve of claim 1, wherein said valve seat is substantially cylindrical.

5. The valve of claim 1, wherein said biasing member includes a bias spring pressing said valve plate into a deformed state during a closed state of said valve.

6. The valve of claim 1, further comprising an actuation member disposed within said body, said actuation member configured to provide a pressure balance within said valve through a bias force imparted to at least one of said valve plate and said coupling plate.

7. The valve of claim 6, wherein said actuation member comprises a flexible diaphragm abutting said coupling plate, and wherein during a closed state of said valve, said diaphragm substantially prevents said fuel cell reactant from flowing between said fluid inlet and said fluid outlet through said fluid reactant passageway, said diaphragm further configured such that during an open state of said valve, said valve plate becomes unseated to permit said fuel cell reactant to flow between said fluid inlet and said fluid outlet through said fluid reactant passageway.

8. The valve of claim 6, wherein said actuation member comprises an electrical stepper motor, brushed motor, brushless motor, or solenoid selectively cooperative with said coupling plate such that during a closed state, said stepper motor substantially prevents said fuel cell reactant from flowing between said fluid inlet and said fluid outlet through said fluid reactant passageway, said stepper motor further configured such that during an open state, said stepper motor causes said valve plate to become unseated to permit said fuel cell reactant to flow between said fluid inlet and said fluid outlet through said fluid reactant passageway.

9. A fuel cell system comprising:
   at least one fuel cell comprising an anode configured to accept a hydrogen-bearing reactant, a cathode configured to accept an oxygen-bearing reactant, and a medium cooperative with said anode and said cathode such that upon catalytic transformation of at least one of said reactants, said catalytically-transformed reactant travels from one of said anode and said cathode to another of said cathode and said anode through said medium;
   an anode flow path in fluid communication with said anode:
   a cathode flow path in fluid communication with said cathode, each of said anode flow path and said cathode flow path being cooperative with a respective fluid inlet configured to receive a fuel cell reactant and a respective fluid outlet disposed fluidly downstream of said fluid inlet; and
   at least one valve disposed in at least one of said anode flow path and said cathode flow path and defining a fluid reactant passageway therethrough, said at least one valve comprising:
      a fluid inlet,
      a fluid outlet,
      a body defining a fluid reactant passageway therethrough that is cooperative with said fluid inlet and said fluid outlet, said body having a valve seat within the fluid reactant passageway between the fluid inlet and fluid outlet,
      an actuation member configured to bias said valve in a preferred position,
      a generally rigid coupling plate adjacent said valve seat, said coupling plate including one or more protruding tabs, and a valve plate seated on said valve seat interposed between said coupling plate and said body, said valve plate defining a seating region adjacent said coupling plate and having a localized connection surface with one or more apertures receiving therein the one or more tabs of the coupling plate, the localized connection surface pressing against said body and said coupling plate to define a point of inflection within said valve plate such that a flexural force induced in said valve plate by a load imparted thereto causes a moment to form at said localized connection surface to thereby initiate a breakup of ice formed at said localized connection surface.

10. The system of claim 9, further comprising a humidification device placed in fluid communication with at least said cathode flow path such that moisture differentials between a portion of said cathode flow path upstream of said at least one fuel cell and a portion of said cathode flow path downstream of said at least one fuel cell may be reduced through operation of said humidification device.

11. The system of claim 10, wherein said at least one valve is placed fluidly between said humidification device and an inlet to said cathode flow path.

12. The system of claim 10, wherein said at least one valve is placed fluidly between said humidification device and an outlet to said cathode flow path.

13. The system of claim 10, wherein said at least one valve comprises a plurality of valves a first of which is placed fluidly between said humidification device and an inlet to said cathode flow path, and a second of which is placed fluidly between said humidification device and an outlet to said cathode flow path.

14. The system of claim 10, wherein said at least one valve is placed fluidly between said humidification device and an inlet to said cathode flow path and between said humidification device and an outlet to said cathode flow path.

15. The system of claim 14, further comprising a back pressure valve fluidly cooperative with said at least one fuel cell to permit a pressure source that is also fluidly cooperative with said at least one fuel cell to build up pressure in said reactant.

16. The system of claim 10, wherein said at least one valve comprises a plurality of valves comprising:
an inlet valve that is placed fluidly upstream of a dry side of a water vapor transfer unit; and
an outlet valve that is placed fluidly downstream of a wet side of said water vapor transfer unit.

17. The system of claim 10, wherein said at least one valve comprises a substantial entirety of selective fluid isolation between said at least one fuel cell and said humidification device.

18. The system of claim 9, wherein said localized connection surface comprises a plurality of tab regions each of which comprises a joining location between said valve plate and said coupling plate such that said initiation of said ice breakup within said localized connection surface takes place adjacent said joining location due to flexural forces imparted to said valve plate.

19. A method of inhibiting freeze-related blockage of a reactant flow path in an automotive fuel cell system, said method comprising:
configuring a valve to be fluidly cooperative with said reactant flow path, said valve comprising:
a fluid inlet configured to receive a fuel cell reactant;
a fluid outlet fluidly downstream of said fluid inlet;
a body defining a fluid reactant passageway therethrough that is cooperative with said fluid inlet and said fluid outlet, said body having a valve seat within said fluid reactant passageway between said fluid inlet and fluid outlet;
an actuation member configured to bias said valve in a preferred position;
a generally rigid coupling plate adjacent said valve seat, said coupling plate including one or more protruding tabs; and
a valve plate seated on said valve seat interposed between said coupling plate and said body, said valve plate defining a seating region adjacent said coupling plate and having a localized connection surface with one or more apertures receiving therein the one or more tabs of the coupling plate, the localized connection surface pressing against said body and said coupling plate to define a point of inflection within said valve plate; and
introducing at least one of a hydrogen-bearing reactant and an oxygen-bearing reactant to said valve plate such that a flexural force induced in said valve plate by said reactant causes a moment to form at said localized connection surface to initiate a breakup of ice formed at said localized connection surface prior in time to a breakup of any ice formed in a substantial remainder of said seating region.

20. The method of claim 19, wherein said flexural force induced in said valve plate takes place commensurate with or prior to movement of said valve between a closed valve state and an open valve state.

21. The method of claim 19, wherein said localized connection surface comprises at least one tab region which comprises a joining location between said valve plate and said body such that said initiation of said ice breakup within said localized connection surface takes place adjacent said joining location due to flexural forces imparted to said valve plate.

22. The method of claim 19, wherein said inhibiting freeze-related blockage is performed during a fuel cell stack cold start in an environmental condition where moisture present in a reactant flowstream may be prone to freezing.

* * * * *